(12) United States Patent  (10) Patent No.: US 6,717,628 B2
Kumagawa et al.  (45) Date of Patent: Apr. 6, 2004

(54) LIQUID CRYSTAL DISPLAY DEVICE

(75) Inventors: Katsuhiko Kumagawa, Neyagawa (JP); Masanori Kimura, Daitou (JP); Tetsuo Fukami, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/279,382

(22) Filed: Oct. 23, 2002

(65) Prior Publication Data

US 2003/0117534 A1 Jun. 26, 2003

Related U.S. Application Data

(63) Continuation of application No. PCT/JP01/03475, filed on Apr. 23, 2001.

(30) Foreign Application Priority Data

Apr. 24, 2000 (JP) ........................................ 2000-122687

(51) Int. Cl.$^7$ ............................................. G02F 1/1343
(52) U.S. Cl. ............................ 349/38; 349/37; 349/39; 349/139
(58) Field of Search ............................ 349/38, 37, 39, 349/139

(56) References Cited

U.S. PATENT DOCUMENTS 6,028,650 A    2/2000  Kuroha et al.

6,317,182 B1   11/2001  Shimizu et al.

FOREIGN PATENT DOCUMENTS

| JP | 5-232509    | 9/1993 |
| JP | 10-393328   | 2/1998 |
| JP | 2000-19558  | 1/2000 |
| JP | 2000-162627 | 6/2000 |

*Primary Examiner*—Robert H. Kim
*Assistant Examiner*—George Y. Wang
(74) *Attorney, Agent, or Firm*—Merchant & Gould P.C.

(57) ABSTRACT

One of a pair of substrates with liquid crystals sandwiched therebetween includes a plurality of pixels each of which is provided with a scanning electrode, an image signal electrode, a switching element provided at an intersection of the scanning electrode and the image signal electrode, a pixel electrode connected to the image signal electrode via the switching element, a counter electrode, and a busbar electrically connected to the counter electrode. A portion of the pixel electrode is overlapped with the busbar so as to make up a storage capacitance. A shape of the pixel electrode is altered for each pixel so that a value of the storage capacitance becomes smaller from a feeding side to a termination side. The portion of the pixel electrode overlapped with the busbar so as to make up the storage capacitance is located within the busbar in a plan view of the device.

1 Claim, 16 Drawing Sheets

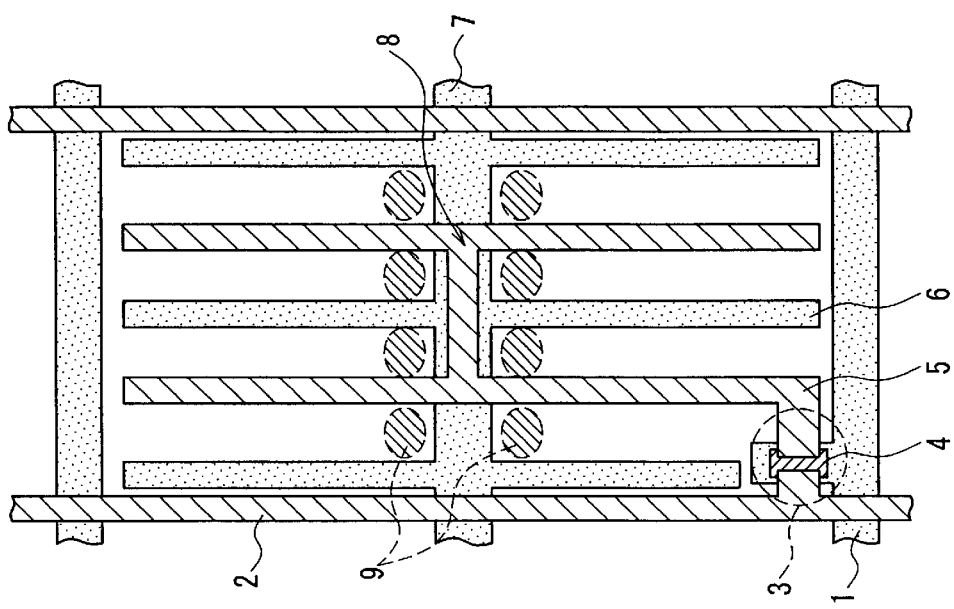
FIG. 1A (Feeding Side)
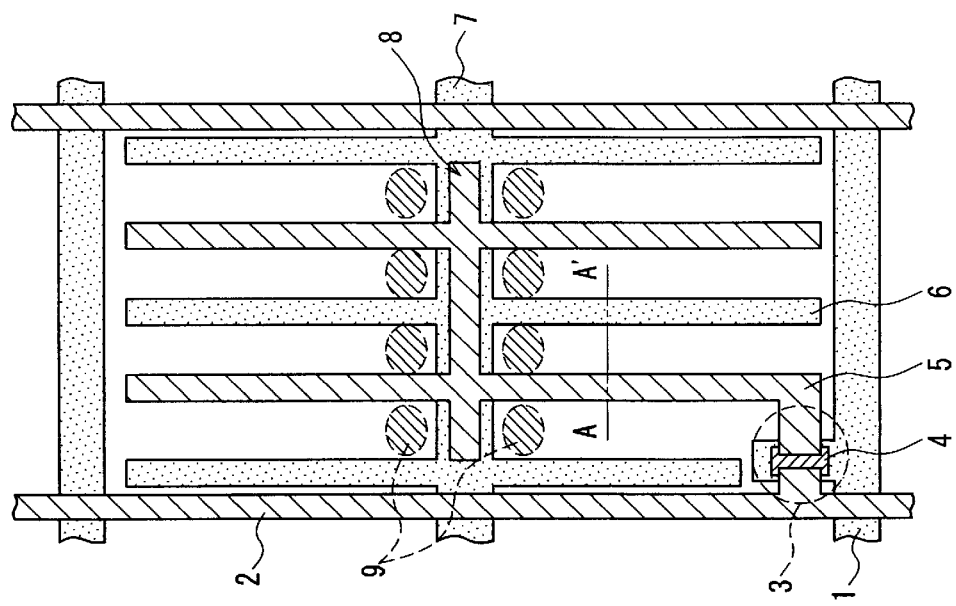
FIG. 1B (Termination Side)

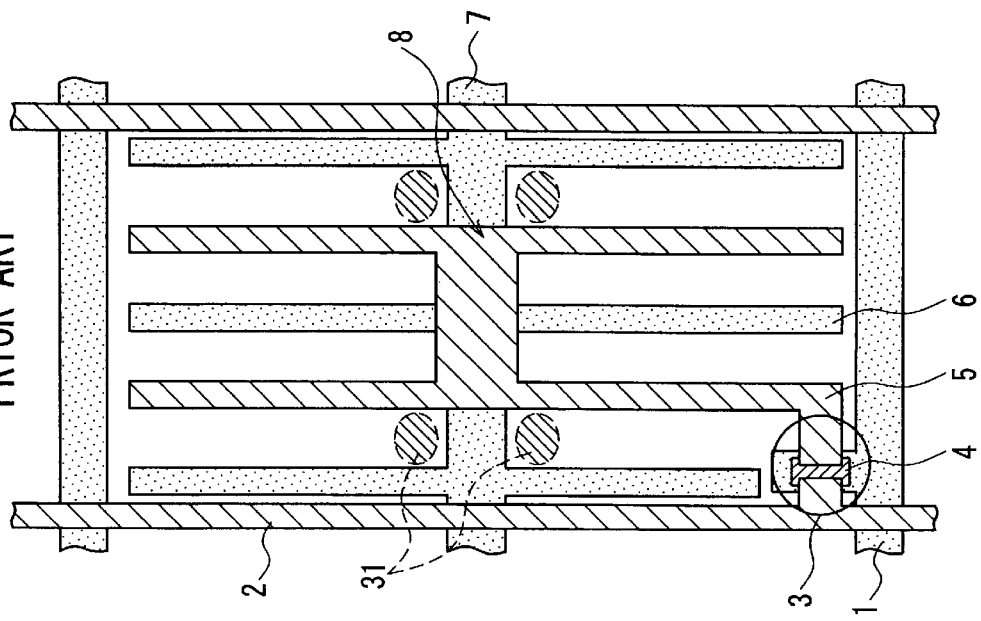
FIG. 3A (Feeding Side) PRIOR ART
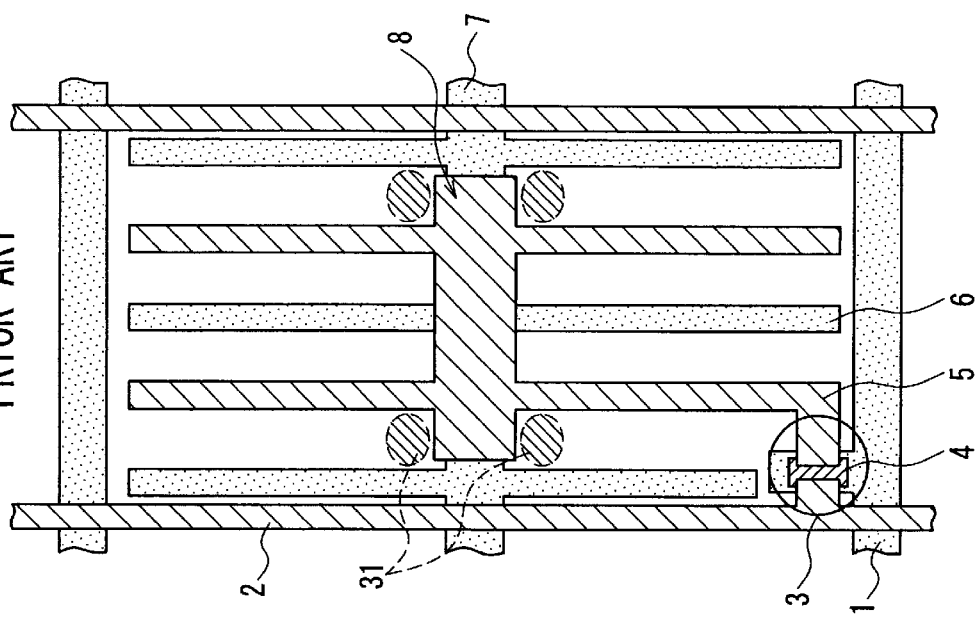
FIG. 3B (Termination Side) PRIOR ART

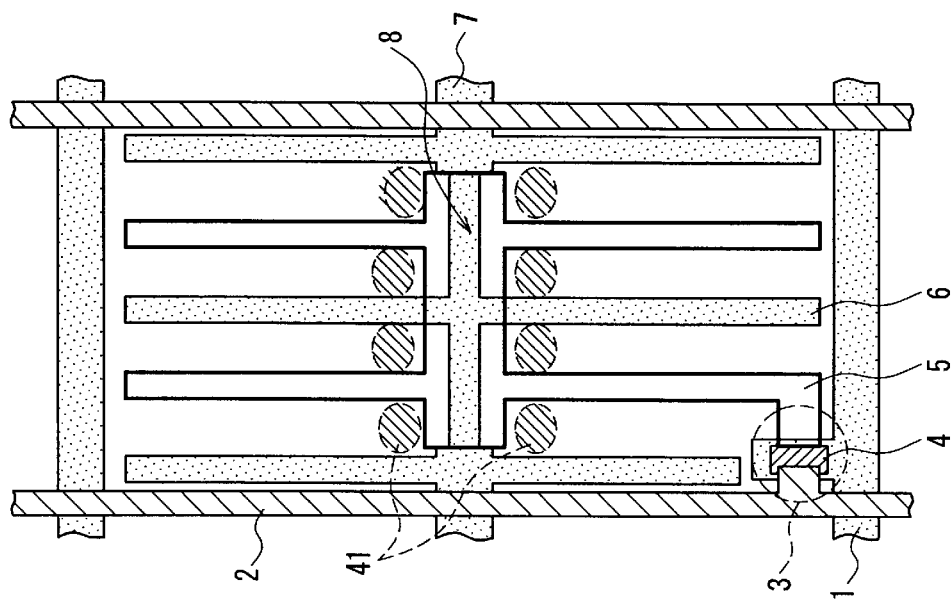
FIG. 4A (Feeding Side)
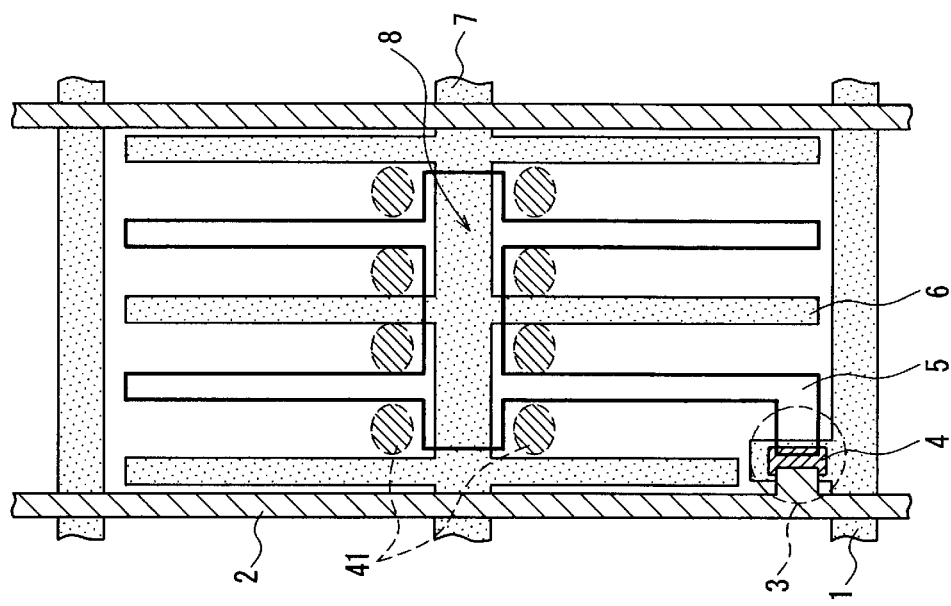
FIG. 4B (Termination Side)

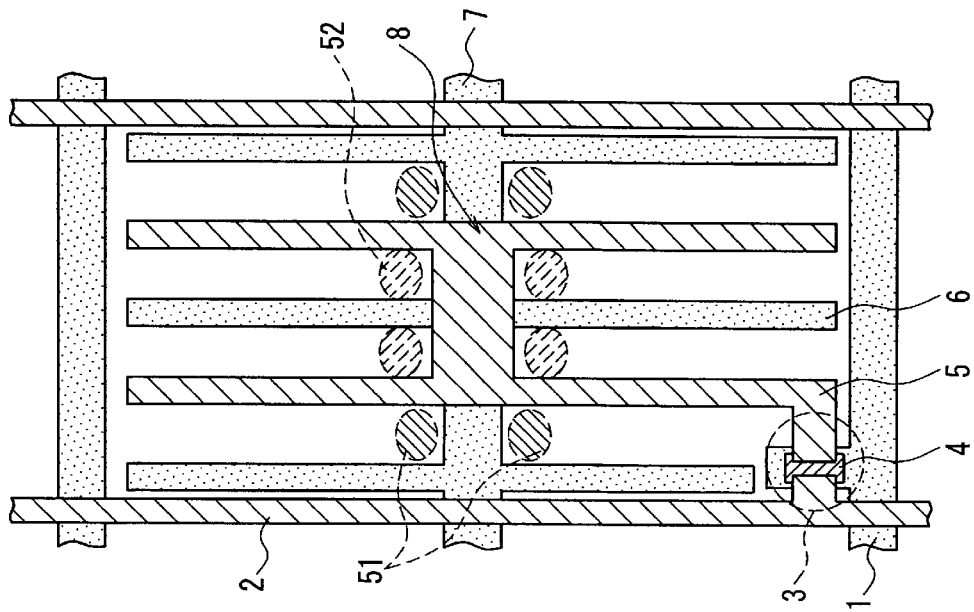
FIG. 5A (Feeding Side)
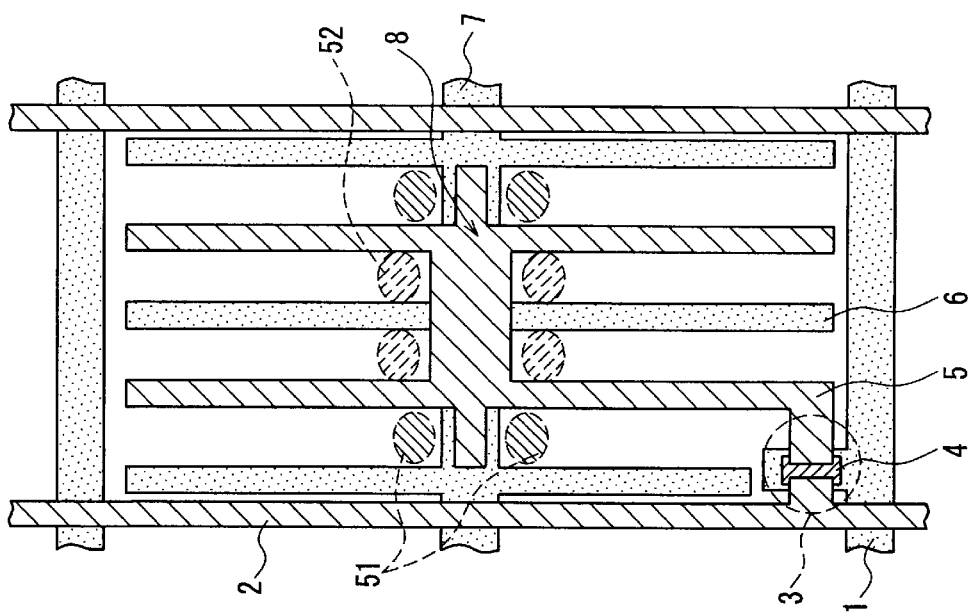
FIG. 5B (Termination Side)

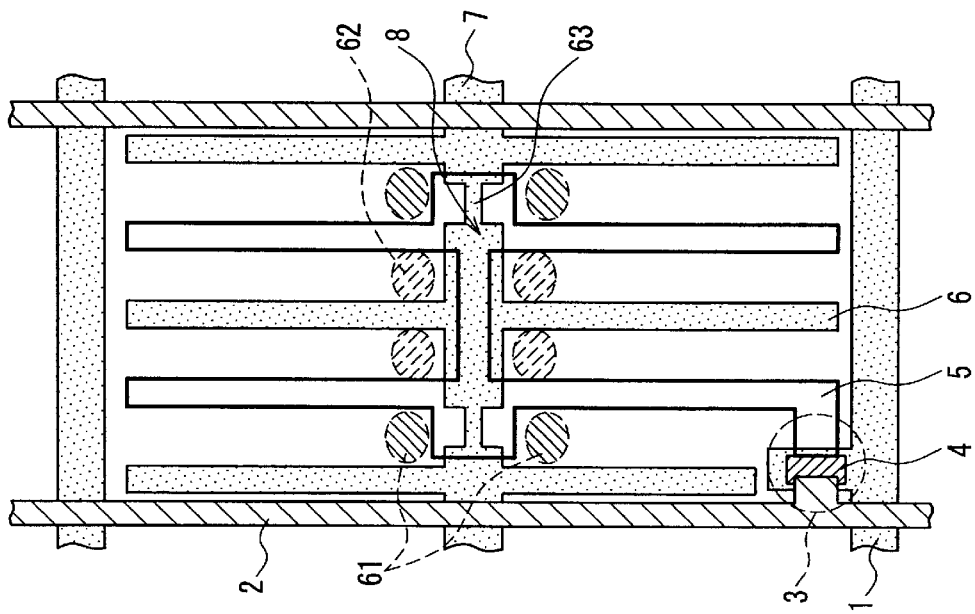
FIG. 6A (Feeding Side)
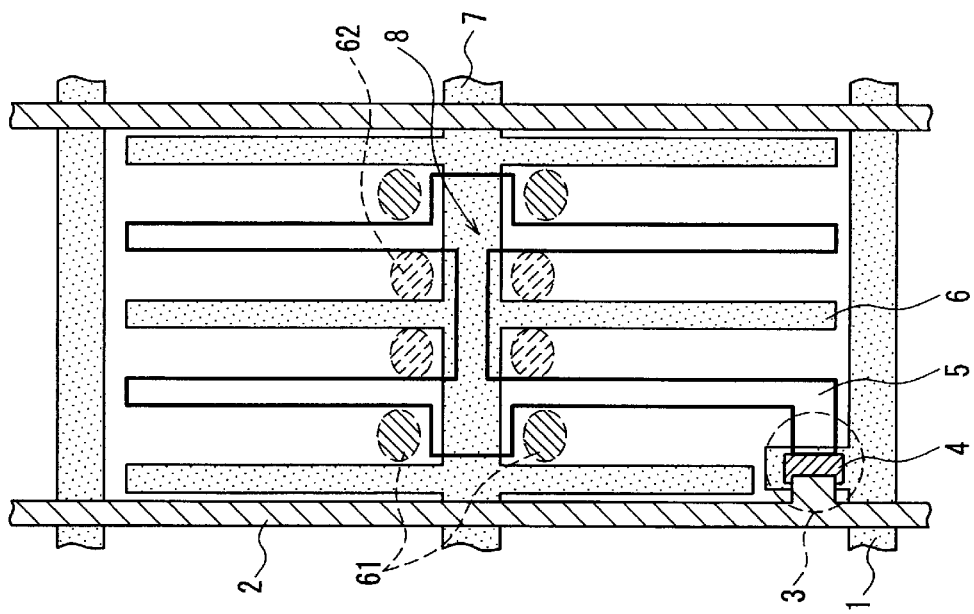
FIG. 6B (Termination Side)

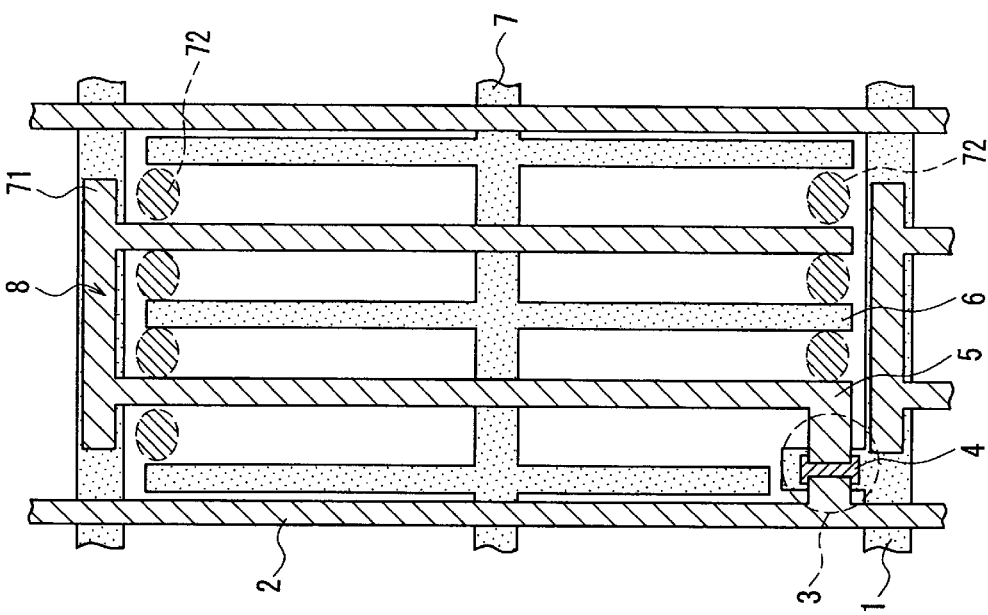
FIG. 7A (Feeding Side)
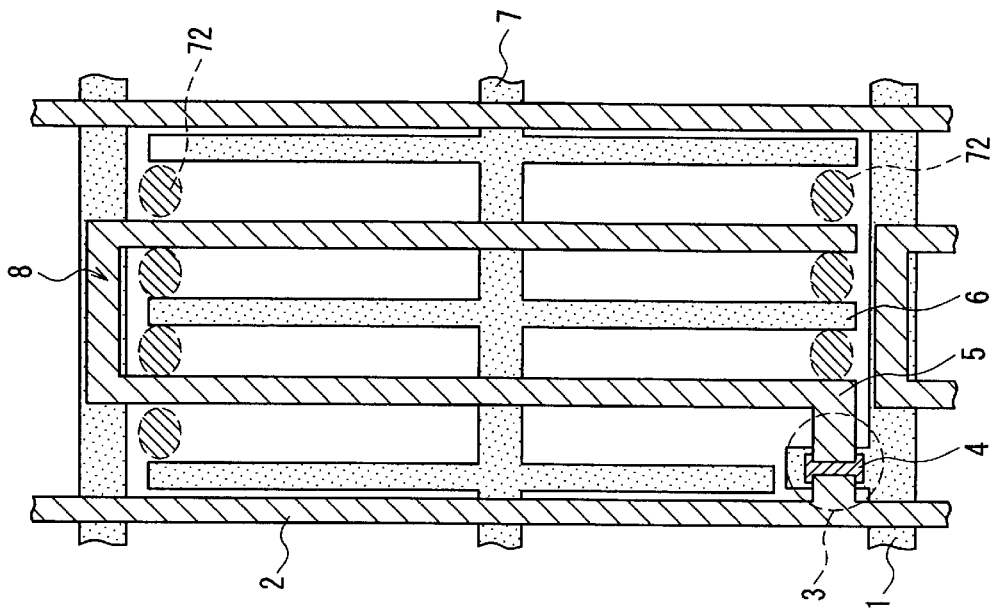
FIG. 7B (Termination Side)

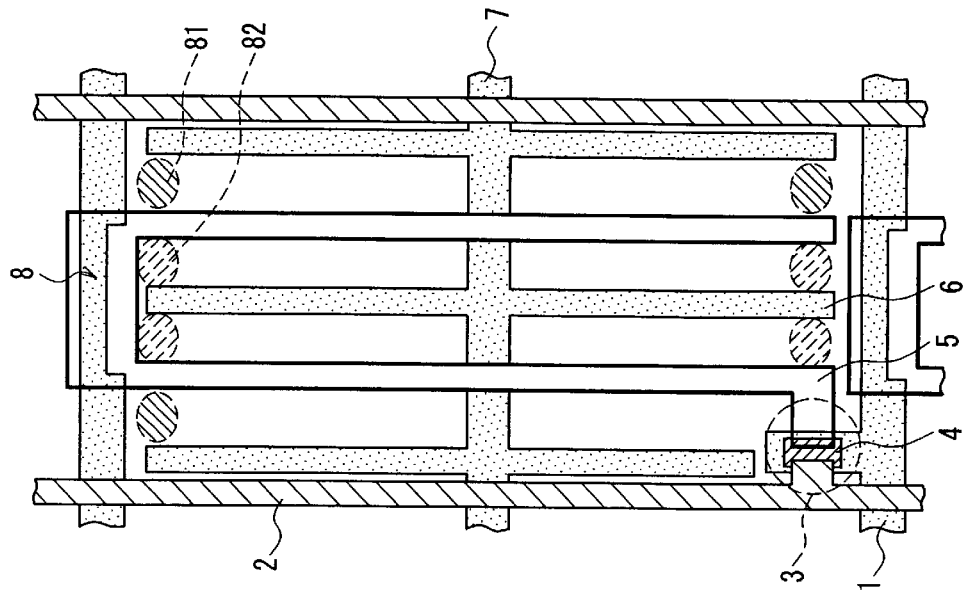
FIG. 8A (Feeding Side)
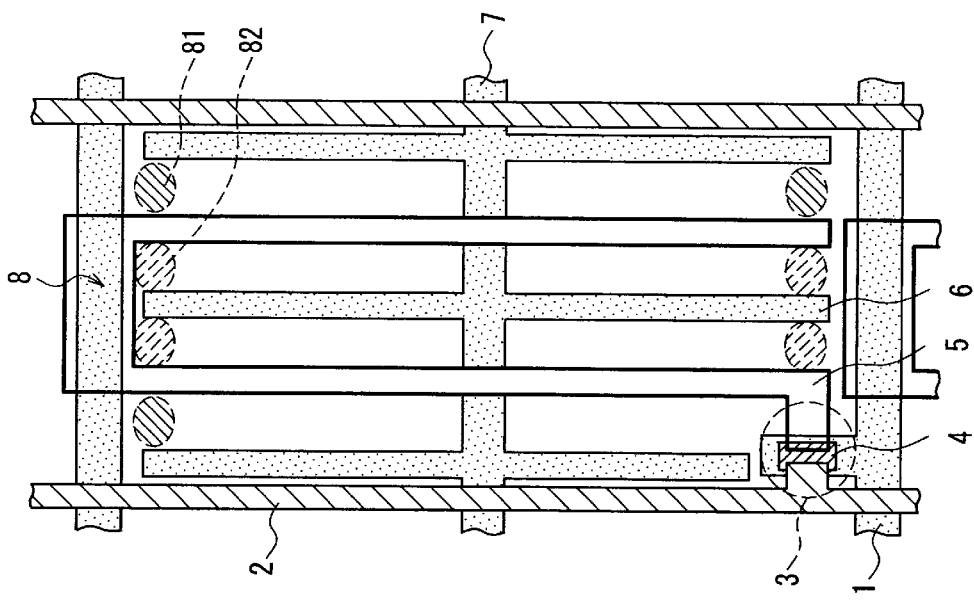
FIG. 8B (Termination Side)

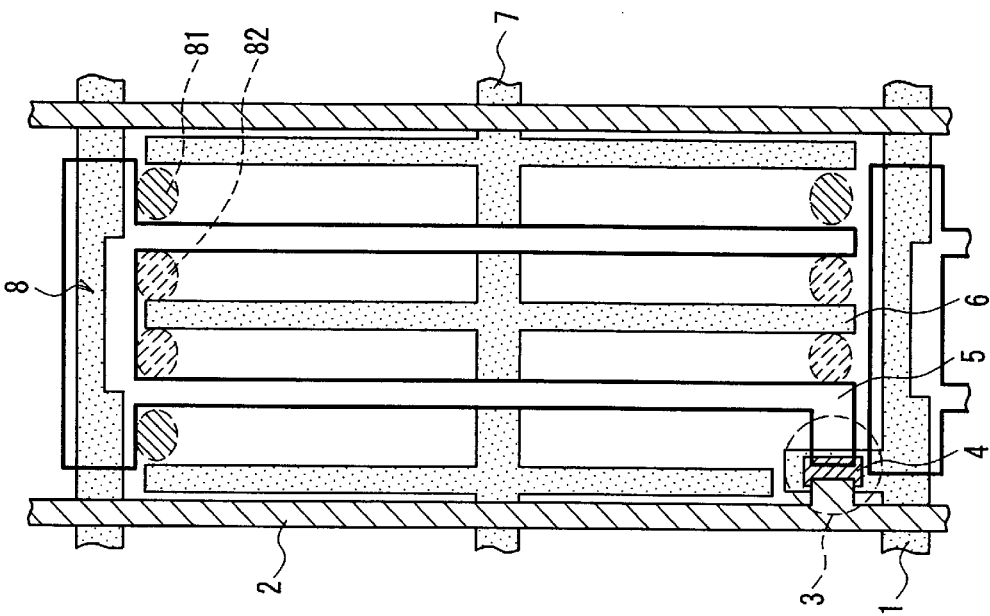
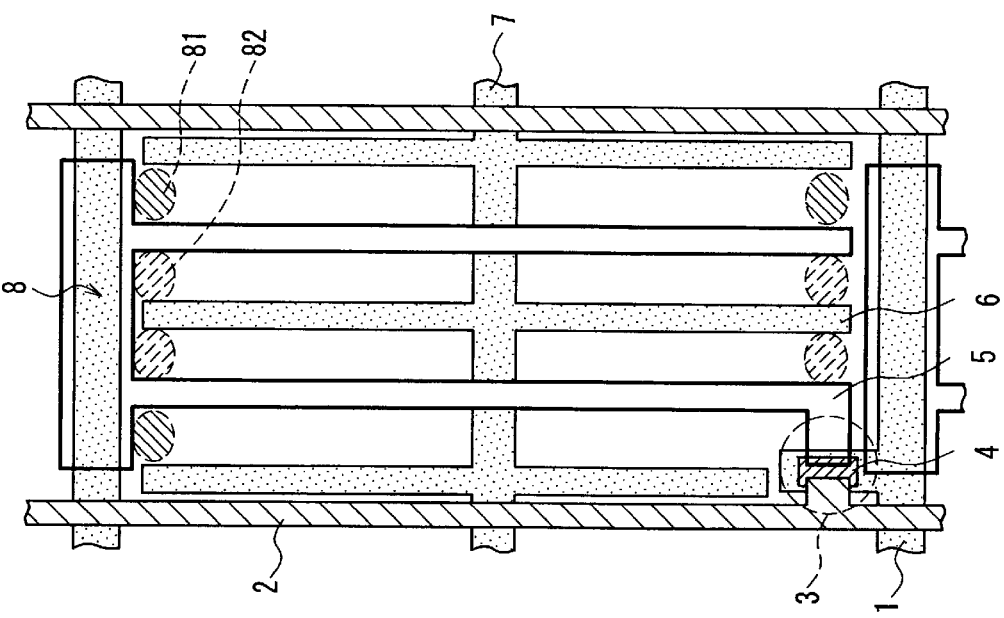

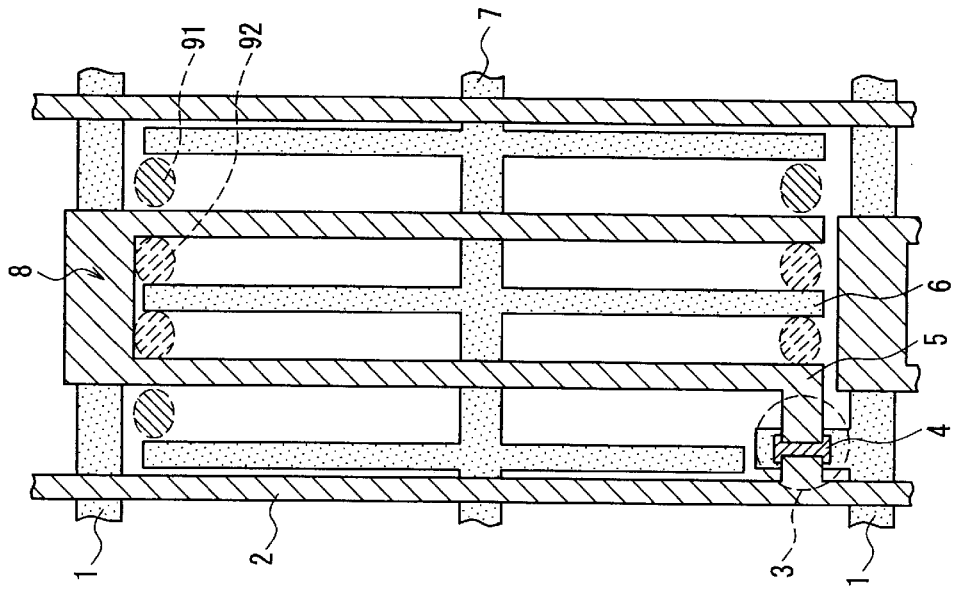
FIG. 10A (Feeding Side)
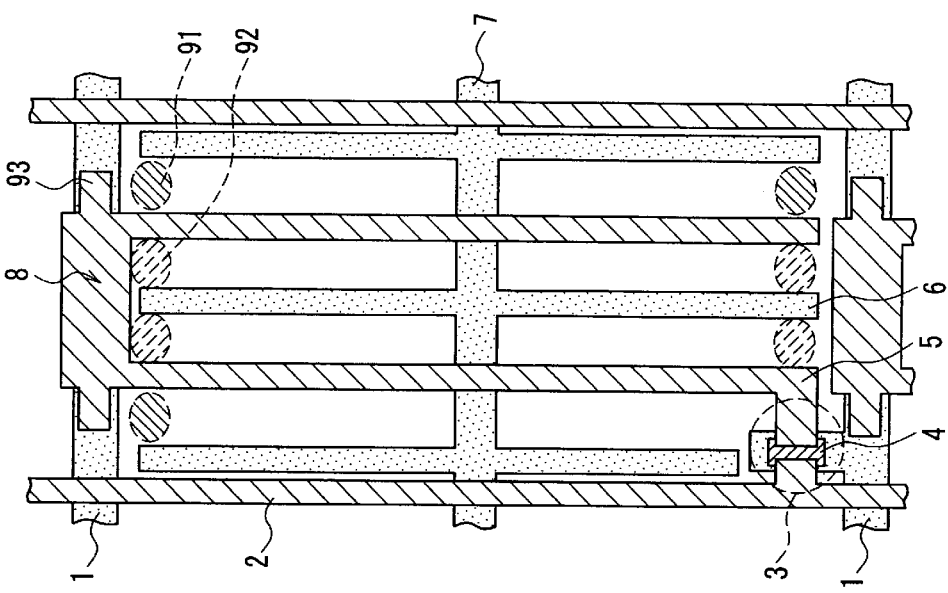
FIG. 10B (Termination Side)

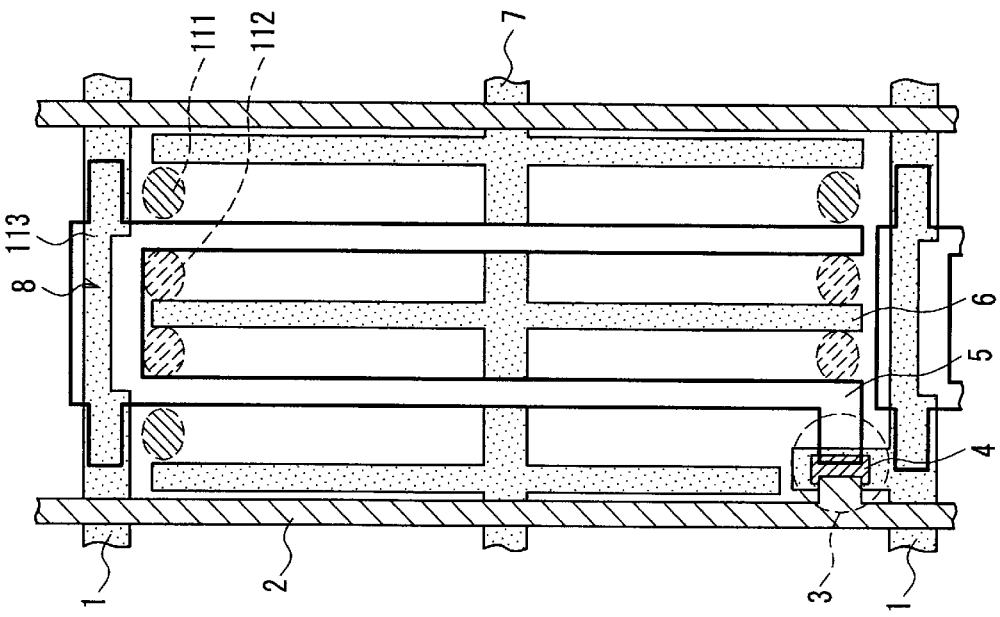
FIG. 11A (Feeding Side)
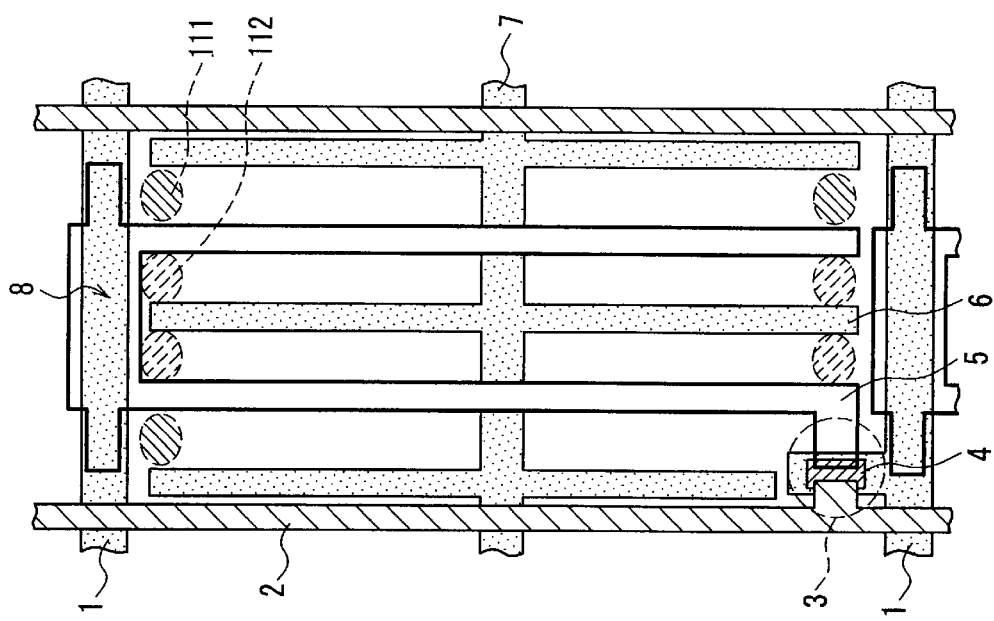
FIG. 11B (Termination Side)

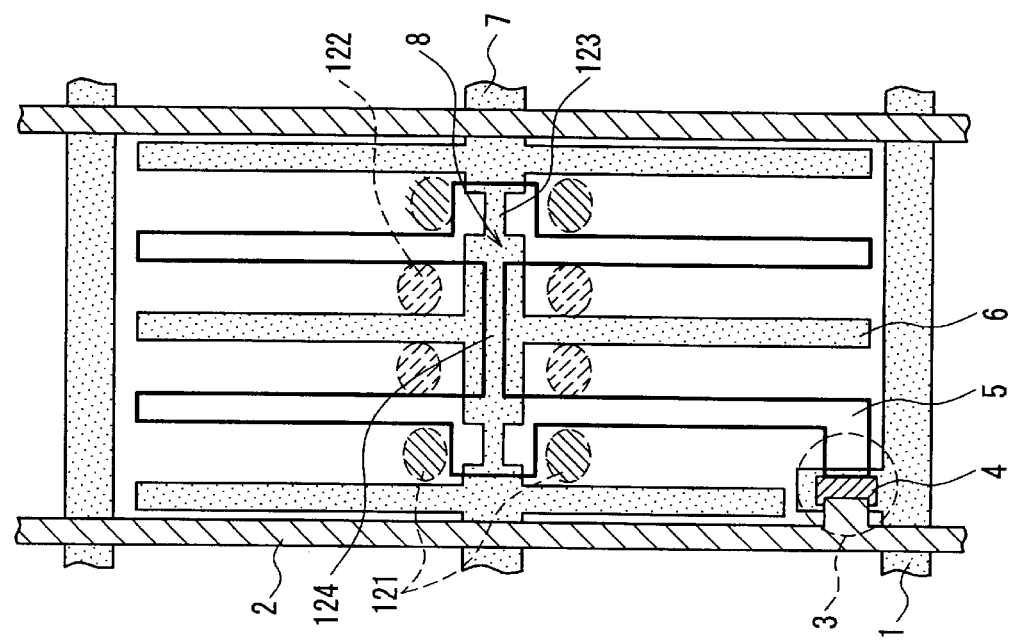
FIG. 12A (Feeding Side)
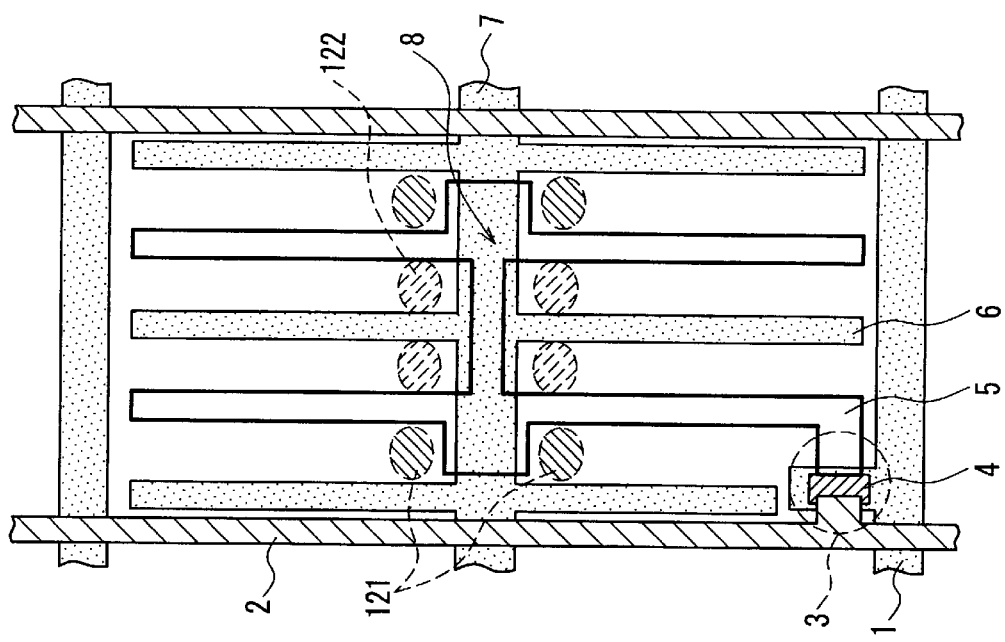
FIG. 12B (Termination Side)

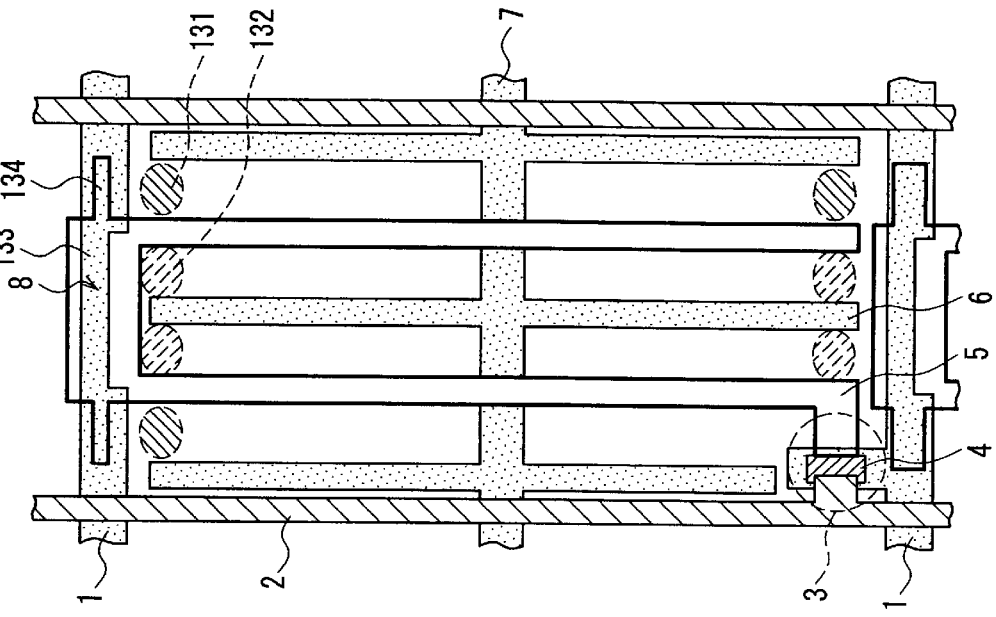
FIG. 13A (Feeding Side)
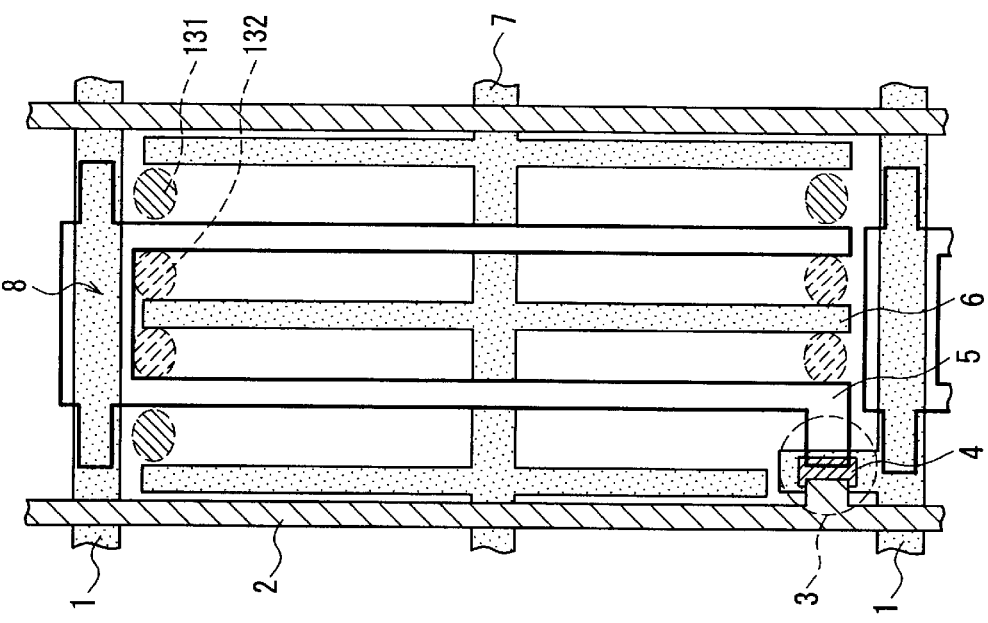
FIG. 13B (Termination Side)

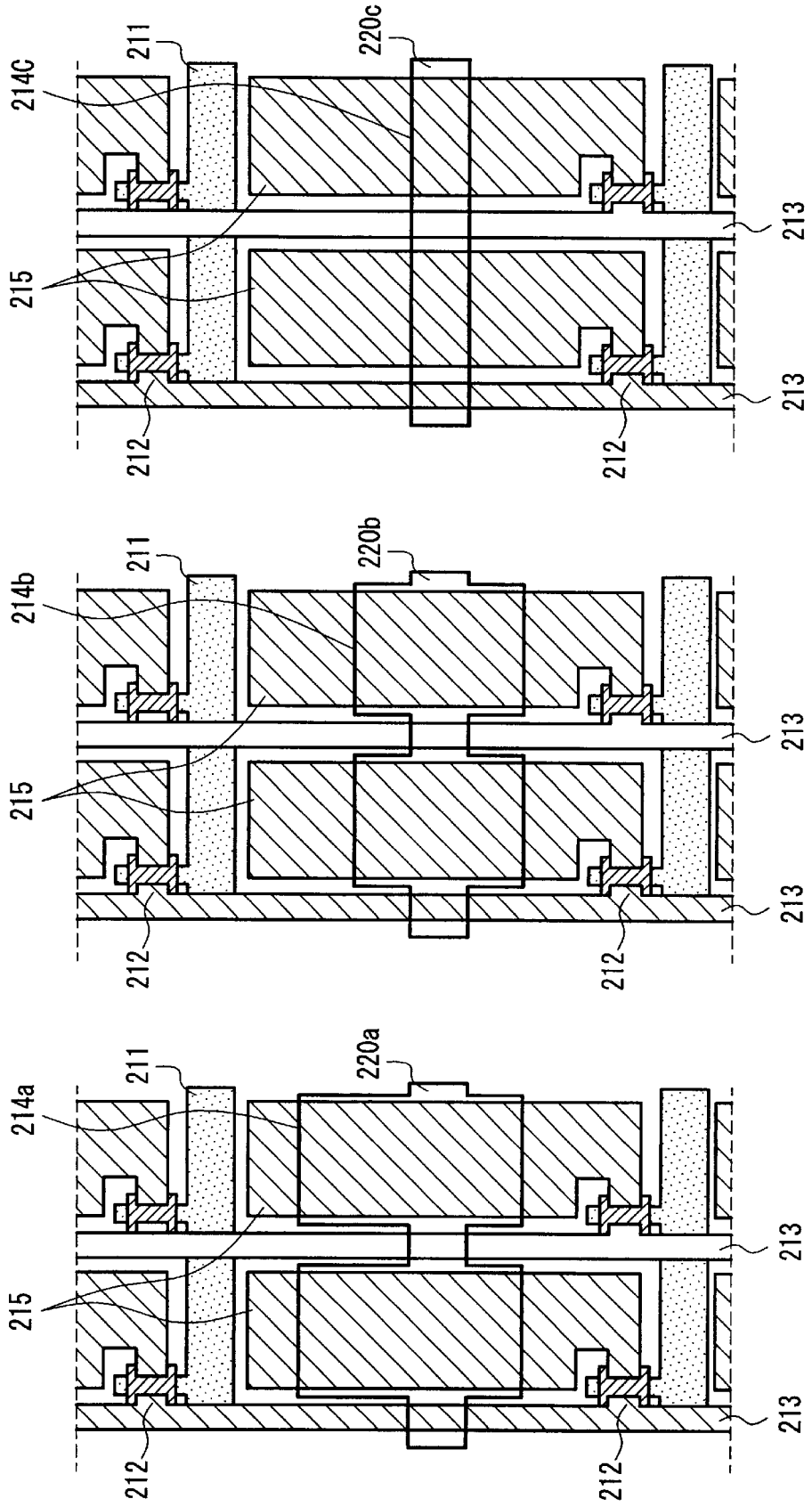

LIQUID CRYSTAL DISPLAY DEVICE

BACKGROUND OF THE INVENTION

1. Field of the Invention

The present invention relates to an active-matrix liquid crystal display device employing switching elements such as thin film transistors.

2. Related Background Art

Liquid crystal display devices featuring a thin and lightweight flat display are used widely as display devices in a variety of electronic equipment. Among them, active-matrix liquid crystal display devices employing switching elements such as thin film transistors are applied vigorously to a monitor display for a personal computer and a liquid crystal television by virtue of their excellent image properties.

With the development of large-size and high-resolution liquid crystal display devices intended for these applications, one problem that arises is display irregularities. This results from a distortion of a scanning voltage waveform, which occurs due to a CR time constant of scanning lines. That is to say, while a scanning voltage pulse hardly includes the rounding at a feeding end of a scanning line, the degree of the rounding in the scanning voltage pulse waveform increases with increasing the distance from the feeding end. As a result, a variation occurs among feed-through voltages applied to each pixel at the falling edge of the scanning pulse. This variation remains as a DC component in a voltage applied to liquid crystals, which results in perceptible flickering of the image. This DC voltage component also causes problems such as image persistence and stains.

A technology for making the feed-through voltage uniform on a panel so as to solve the above-stated problems is disclosed in JP 10(1998)-39328 A. FIGS. 15 and 16 show a configuration of the technology. FIG. 15 is a plan view of a liquid crystal display device, where numeral 201 denotes a liquid crystal panel, 202 denotes a driving circuit for scanning lines, and 203 denotes a driving circuit for image signal lines. FIGS. 16A to 16C are enlarged views of parts A, B and C of FIG. 15, respectively.

In FIGS. 16A to 16C, numeral 211 denotes a scanning electrode and 213 denotes an image signal electrode. A thin film transistor 212 functioning as a switching element is provided at a position of intersection of these electrodes. A pixel electrode 215 is connected to the image signal electrode 213 via the thin film transistor 212. A gate electrode of the thin film transistor 212 is connected to the scanning electrode 211. Numerals 220a, 220b and 220c denote auxiliary capacitance lines provided beneath an interlayer insulating film (not illustrated), which have overlapping portions 214a, 214b and 214c with the pixel electrode 215 so as to form a storage capacitance.

Compared with an area of the overlapping portion 214b in the part B, the overlapping portion 214a in the part A is larger, while the overlapping portion 214c in the part C is smaller. With this configuration, the storage capacitance formed with the overlapping portion becomes smaller with increasing the distance from a feeding end of a scanning line, so that a variation in the feed-through voltage resulting from the rounding in the scanning voltage waveform can be deleted. Moreover, by forming the auxiliary capacitance lines 220a, 220b and 220c with transparent electrodes, areas of allowing the light to be passed can be made equal among the parts A, B and C.

However, when adapting the above-stated configuration to a liquid crystal display device like an in-plane switching type liquid crystal display device that has a portion not covered with a pixel electrode in a pixel area, an electric field applied to the liquid crystal layer would be disturbed because of a change in area of the storage capacitances. As a result, problems occur in that the display properties deteriorate and the display properties vary from each pixel.

SUMMARY OF THE INVENTION

The object of the present invention is to provide an active-matrix liquid crystal display device in which, although an area of a storage capacitance is altered for each pixel, electric fields applied to display portions can be made uniform irrespective of pixels.

A liquid crystal display device according to the present invention is an improved active-matrix liquid crystal display device including a first substrate, a second substrate, and liquid crystals sandwiched between the first substrate and the second substrate. In this device, the first substrate includes a plurality of pixels, each of which is provided with a scanning electrode, an image signal electrode, a switching element provided at a point of intersection of the scanning electrode and the image signal electrode, a pixel electrode connected to the image signal electrode via the switching element, a counter electrode that activates the liquid crystals present between the counter electrode and the pixel electrode by a potential difference.

In order to fulfill the above-described object, according to the first configuration of the liquid crystal display device, a portion of the pixel electrode is overlapped with a busbar electrically connected to the counter electrode so as to make up a storage capacitance. A shape of the pixel electrode is altered for each pixel so that a value of the storage capacitance becomes smaller from a feeding side to a termination side, and the portion of the pixel electrode overlapped with the busbar so as to make up the storage capacitance is located within the busbar in a plan view of the device.

With this configuration, aperture ratios and electric fields close to the liquid crystal display areas can be made constant irrespective of pixels. Therefore, uniform display free from disturbances and variations in the display properties among the pixels can be obtained. This configuration also has the advantages of facilitating large-sized and high-resolution display, because the time constants of the scanning electrodes and the common electrodes can be both made small, and of facilitating the design and the process thereof by virtue of its simple configuration.

According to the second configuration of the liquid crystal display device, a portion of the pixel electrode is overlapped with the busbar so as to make up a storage capacitance. A shape of the busbar is altered for each pixel so that a value of the storage capacitance becomes smaller from a feeding side to a termination side, and the pixel electrode overlapped with the busbar so as to make up the storage capacitance covers a portion of the busbar where the shape thereof is altered for each pixel in a plan view of the device.

With this configuration, uniform display can be realized in the same manner as in the above device. This configuration also has the features of facilitating large-sized and high-resolution display because the time constant of the scanning electrodes can be made small; being tolerant of a noise in a driving waveform because the storage capacitance can be increased easily; suppressing a break in the electrode, which can improve the yields; and obtaining still higher uniformity because of the effect of electric field shielding.

According to the third configuration of the liquid crystal display device, a portion of the pixel electrode is overlapped with the busbar so as to make up a storage capacitance. The portion of the pixel electrode overlapped with the busbar so as to make up the storage capacitance includes: a commonly shaped portion having a shape common to pixels on a feeding side and pixels on a termination side; and an additional portion. The commonly shaped portion extends beyond the busbar in a plan view of the device and the additional portion is located within the busbar in the plan view of the device. A shape of the additional portion is altered for each pixel, so that a value of the storage capacitance becomes smaller from the feeding side to the termination side.

With this configuration, uniform display can be realized in the same manner as in the above devices. This configuration also has the advantages of: facilitating large-sized and high-resolution display because both of the time constants of the scanning electrodes and the common electrodes can be made small; being tolerant of a noise in a driving waveform because the storage capacitance can be increased easily; and suppressing a break in the electrode, which can improve the yields.

According to the fourth configuration of the liquid crystal display device, a portion of the pixel electrode is overlapped with the busbar so as to make up a storage capacitance. The busbar includes: a commonly shaped portion having a shape common to pixels on a feeding side and pixels on a termination side; and a narrowed portion provided for the pixels on the termination side. The commonly shaped portion extends beyond the pixel electrode in a plan view of the device and the narrowed portion at the termination side is located within the pixel electrode in the plan view of the device. A shape of the narrowed portion at the terminations side is altered for each pixel, so that a value of the storage capacitance becomes smaller from the feeding side to the termination side.

With this configuration, uniform display can be realized in the same manner as in the above devices. This configuration also has the feature of: facilitating large-sized and high-resolution display because the time constant of the scanning electrodes can be made small.

According to the fifth configuration of the liquid crystal display device, a portion of the pixel electrode is overlapped with the scanning electrode so as to make up a storage capacitance. A shape of the pixel electrode is altered for each pixel so that a value of the storage capacitance becomes smaller from a feeding side to a termination side, and the portion of the pixel electrode overlapped with the scanning electrode so as to make up the storage capacitance is located within the scanning electrode in a plan view of the device.

With this configuration, uniform display can be realized in the same manner as in the above devices. This configuration also has the features of: improving the aperture ratio by narrowing the width of the common electrode; and facilitating the design and the process thereof by virtue of its simple configuration.

According to the sixth configuration of the liquid crystal display device, a portion of the pixel electrode is overlapped with the scanning electrode so as to make up a storage capacitance. A shape of the scanning electrode is altered for each pixel so that a value of the storage capacitance becomes smaller from a feeding side to a termination side, and the pixel electrode overlapped with the scanning electrode so as to make up the storage capacitance covers a portion of the scanning electrode where the shape thereof is altered for each pixel in a plan view of the device.

With this configuration, uniform display can be realized in the same manner as in the above devices. This configuration also has the advantages of improving the aperture ratio by narrowing the width of the common electrode; being tolerant of a noise in a driving waveform because the storage capacitance can be increased easily; and suppressing a break in the electrode, which can improve the yields.

According to the seventh configuration of the liquid crystal display device, a portion of the pixel electrode is overlapped with the scanning electrode so as to make up a storage capacitance. The portion of the pixel electrode overlapped with the scanning electrode so as to make up the storage capacitance includes: a commonly shaped portion having a shape common to pixels on a feeding side and pixels on a termination side and; an additional portion. The commonly shaped portion extends beyond the scanning electrode in a plan view of the device, and the additional portion is located within the scanning electrode in the plan view of the device. A shape of the additional portion is altered for each pixel, so that a value of the storage capacitance becomes smaller from the feeding side to the termination side.

With this configuration, uniform display can be realized in the same manner as in the above devices. This configuration also has the advantages of: improving the aperture ratio by narrowing the width of the common electrode; being tolerant of a noise in a driving waveform because the storage capacitance can be increased easily; and suppressing a break in the electrode, which can improve the yields.

According to the eighth configuration of the liquid crystal display device, a portion of the pixel electrode is overlapped with the scanning electrode so as to make up a storage capacitance. The scanning electrode includes: a commonly shaped portion having a shape common to pixels on a feeding side and pixels on a termination side; and a narrowed portion provided for the pixels on the termination side. The commonly shaped portion extends beyond the pixel electrode in a plan view of the device, and the narrowed portion at the termination side is located within the pixel electrode in the plan view of the device. A shape of the narrowed portion at the terminations side is altered for each pixel, so that a value of the storage capacitance becomes smaller from the feeding side to the termination side.

With this configuration, uniform display can be realized in the same manner as in the above devices. This configuration also can improve the aperture ratio by narrowing the width of the common electrode.

BRIEF DESCRIPTION OF THE DRAWINGS

FIGS. 1A and 1B are plan views showing a configuration of a pixel of a liquid crystal display device according to Embodiment 1 of the present invention.

FIGS. 3A and 3B are plan views showing a configuration of a pixel of a liquid crystal display device used for a comparative explanation.

FIGS. 4A and 4B are plan views showing a configuration of a pixel of a liquid crystal display device according to Embodiment 2 of the present invention.

FIGS. 5A and 5B are plan views showing a configuration of a pixel of a liquid crystal display device according to Embodiment 3 of the present invention.

FIGS. 6A and 6B are plan views showing a configuration of a pixel of a liquid crystal display device according to Embodiment 4 of the present invention.

FIGS. 7A and 7B are plan views showing a configuration of a pixel of a liquid crystal display device according to Embodiment 5 of the present invention.

FIGS. 8A and 8B are plan views showing a configuration of a pixel of a liquid crystal display device according to Embodiment 6 of the present invention.

FIGS. 9A and 9B are plan views showing another configuration of a pixel of a liquid crystal display device according to Embodiment 6 of the present invention.

FIGS. 10A and 10B are plan views showing a configuration of a pixel of a liquid crystal display device according to Embodiment 7 of the present invention.

FIGS. 11A and 11B are plan views showing a configuration of a pixel of a liquid crystal display device according to Embodiment 8 of the present invention.

FIGS. 12A and 12B are plan views showing a configuration of a pixel of a liquid crystal display device according to Embodiment 9 of the present invention.

FIGS. 13A and 13B are plan views showing another configuration of a pixel of a liquid crystal display device according to Embodiment 9 of the present invention.

FIGS. 16A, 16B and 16C are plan views showing a configuration of a pixel of a conventional liquid crystal display device.

DETAILED DESCRIPTION OF THE INVENTION

Figure 2:
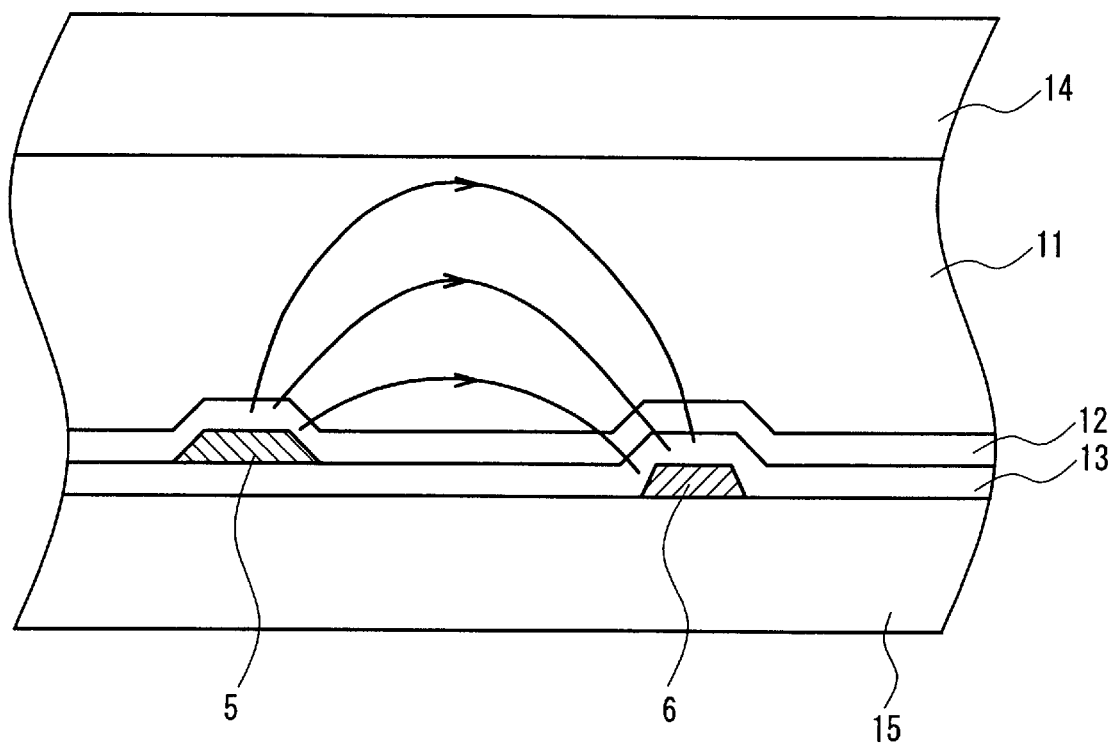
FIG. 2 is a cross-sectional view showing a cross-section of the pixel of the liquid crystal display device according to Embodiment 1 of the present invention.

The following describes embodiments of the present invention, with reference to drawings. For the sake of clarity, in these drawings, the same reference numeral is assigned to electrodes having the same function, in spite of their different shapes.

Embodiment 1

FIGS. 1A and 1B are plan views showing a configuration of a liquid crystal display device according to Embodiment 1 of the present invention. In FIG. 1, numeral 1 denotes a scanning electrode and 2 denotes an image signal electrode. A thin film transistor 3 (hereinafter abbreviated as TFT) functioning as a switching element is formed at a position of intersection of these electrodes. Numeral 4 denotes a semiconductor layer for forming a channel of the TFT 3. A gate electrode, a source electrode and a drain electrode of the TFT 3 are connected to the scanning electrode 1, the image signal electrode 2 and a pixel electrode 5, respectively. The pixel electrode and a counter electrode 6 are both shaped like a comb, and liquid crystals present therebetween are activated by an electric field between both electrodes 5 and 6, thus giving an image.

FIG. 2 is a cross-sectional view taken along line A–A' of FIG. 1A. In FIG. 2, numeral 15 denotes one substrate, on which the pixel electrodes 5 and the counter electrodes 6 are formed. Numeral 13 denotes an interlayer insulating film used as a separation between the two electrodes, and 12 denotes a passivation film for protecting the TFT. Numeral 11 denotes a liquid crystal layer, which is sandwiched between the substrate 15 and the other substrate 14.

As shown in FIG. 2, a potential difference between the pixel electrode 5 and the counter electrode 6 generates electric lines of force shown by arrows. This figure shows the lines that pass through the liquid crystal layer 11. The electric lines of force not located above the electrodes predominantly have a component parallel to the substrate 15, and such an electric field parallel to the substrate 15 makes liquid crystals operate. In this liquid crystal display device, the pixel electrode 5 is not present all over the area where liquid crystals operate. Therefore, the electric field tends to vary due to the subtle difference in the shape of the electrode edges and their location, thus resulting in perceptible display irregularities.

As shown in FIG. 1, a plurality of counter electrodes 6 are connected with each other via a busbar 7. A portion of the pixel electrode 5 is overlapped with this busbar 7, where the interlayer insulating layer is sandwiched between a first conductive layer making up the counter electrode 6 and a second conductive layer making up the pixel electrode 5 so that a storage capacitance 8 is formed. That is, the busbar 7 functions as a common electrode for the storage capacitance 8.

An area of the overlapping portion is decreased gradually from a feeding side end to the termination, by altering a shape of the pixel electrode 5 for each pixel. "Decreased gradually" means the following condition. That is, the overlapping portion is decreased in a manner that the storage capacitance formed with the overlapping portion becomes smaller with increasing the distance from a feeding end of the scanning line so as to make the feed-through voltage uniform along the scanning line. Usually the area of the overlapping portion should be decreased without abrupt change, for example, in inverse proportion to the distance from a feeding end of the scanning line.

For example, the pixel electrode at the termination side may be shaped like a letter H as shown in FIG. 1B, while the pixel electrode at the feeding side end may be shaped having a protrusion at either side as shown in FIG. 1A. Then, the size of the protrusion may be altered gradually, so that the value of the storage capacitance 8 also is decreased gradually from the feeding end to the termination.

According to this embodiment, the pattern in the overlapping portions is designed so that the pixel electrode 5 with a shape altered for each pixel is located within the busbar 7 as the opposite electrode. Accordingly, outer edges of a plurality of electrodes making up the storage capacitances 8 are identical in all of the pixels, and therefore their aperture ratios are constant irrespective of the pixels. Moreover, since these outer edges are configured with the same electrode in all of the pixels, electric fields around the storage capacitances 8 also are constant irrespective of the pixels. As a result, uniform display without irregularities can be realized. The following describes this respect.

First, a comparative example will be described, referring to FIGS. 3A and 3B. According to the configuration shown in these figures, the pixel electrode 5 with a shape altered for each pixel extends beyond the edges of the busbar 7 as a common electrode. With this configuration, as illustrated by the examples at the feeding side and the termination side in FIGS. 3A and 3B, respectively, the aperture ratio differs from the pixels. To address this, if the pixel electrode 5 is made of a transparent electrode or a portion that causes a difference in the aperture area is covered with a light-shielding film, then the aperture ratio would be made uniform. However, a problem of a nonuniform electric field would remain, which will be described in the following.

In the storage capacitance 8, the pixel electrode 5 and the busbar 7 respectively are in contact with portions 31 close to the storage capacitance (hereinafter called "neighboring portion") at the feeding side (FIG. 3A) and at the termination side (FIG. 3B). The neighboring portions 31 are shown by the diagonally shaded areas in these figures. Since the potentials of these electrodes are different from each other, electric fields at the neighboring portions 31 differ between the feeding side and the termination side. As a result, the orientation of liquid crystals differs between these portions, which generates a difference in display luminance, thus resulting in perceptible display irregularities. If such a difference in display luminance is eliminated by covering this portion with a light-shielding film, then the aperture ratio would be degraded considerably. This is because an area of the light-shielding film formed has to be made relatively large for two reasons that the influence on the orientation of liquid crystals due to electric fields extends in the range of several $\mu$m from the electrode edge, and that a several $\mu$m of dimensional margin is necessary for the patterning of forming the light-shielding film and for aligning two substrates.

On the other hand, according to the configuration of the present invention shown in FIG. 1, the busbar 7 is in contact with a neighboring portion 9 at both of the feeding side (FIG. 1A) and the termination side (FIG. 1B). Therefore, although the area of the storage capacitance 8 is altered for each pixel, electric fields at portions contributing to display (i.e., a gap between the pixel electrode 5 and the counter electrode 6) can be kept uniform. Moreover, the aperture ratio can be uniform without forming a light-shielding film. Furthermore, even in the case where a light-shielding film is formed for enhancing the contrast, a narrow light-shielding film is good enough compared with the configuration shown in FIG. 3, and therefore the aperture ratio is not degraded considerably.

The configuration of this embodiment is suitable for a large-sized and high-resolution device compared with the other embodiments, which will be described later, for the reasons that the time constant of the scanning electrode 1 is small because the storage capacitance is not formed on the scanning electrode 1, and that, since there is no need to form a narrow portion in the busbar 7 as the common electrode, the resistance of the common electrode is not increased, which means no increase in the time constant of the common electrode. In addition, this embodiment has another advantage in that the design and the process can be conducted easily because of its simple configuration.

Embodiment 2

FIGS. 4A and 4B are plan views showing a configuration of a liquid crystal display device according to Embodiment 2 of the present invention. In these figures, although the pixel electrode 5 is made of the same electrode layer as in the image signal line 2 like the above embodiment, the hatch pattern is omitted and a bold outline is used for the sake of clarity.

Unlike Embodiment 1 where the area of the pixel electrode 5 making up the storage capacitance 8 is altered for each pixel, the width of the busbar 7 connecting the counter electrodes 6, which functions as the common electrode, is altered for each pixel, whereby the value of the storage capacitance is decreased from the feeding side (FIG. 4A) to the termination side (FIG. 4B).

With the configuration of this embodiment, the pixel electrode 5 is in contact with a neighboring portion 41 at both of the feeding side and the termination side. Therefore, the same effects as in Embodiment 1 can be obtained. That is, although the area of the storage capacitance 8 is altered for each pixel, electric fields at portions contributing to display (i.e., a gap between the pixel electrode 5 and the counter electrode 6) can be kept uniform. Moreover, the aperture ratio can be uniform without forming a light-shielding film. Furthermore, even in the case where a light-shielding film is formed for enhancing the contrast, a narrow light-shielding film is good enough compared with the configuration shown in FIG. 3, and therefore the aperture ratio is not degraded considerably.

The following describes the other features of this embodiment.

Firstly, this embodiment is suitable for a large-sized and high-resolution device for the reasons that the time constant of the scanning electrode 1 is small because the storage capacitance 8 is not formed on the scanning electrode 1, and that, since there is no need to form a narrow portion in the busbar 7, the resistance of the common electrode is not increased, which means no increase in the time constant of the common electrode.

Secondly, the yields can be improved by this embodiment. When forming the storage capacitance 8, the pixel electrode 5 has to be formed over a step at the side edge of the busbar 7. In the configuration shown in FIG. 1, the comb-shaped electrode portion is formed over the step, which might cause a break in the line and this might result in a defect of the pixel. According to the configuration in this embodiment, the pixel electrode 5 is formed over the step all along the width of the storage capacitance so that the comb-shaped electrode portion is arranged on a flat face. Therefore, a break in a line at the step can be suppressed, so that the yields can be improved.

Thirdly, at the storage capacitance 8, the pixel electrode 5 located above the busbar 7 and so closer to the liquid crystal layer covers thoroughly the busbar 7, which completely prevents the electric field of the busbar 7 from leaking into the liquid crystal layer. Accordingly, irrespective of different shapes in the busbar 7, which is contrived for altering the storage capacitance, more uniform display can be realized as compared with Embodiment 1, because the generation of leakage electric fields is not caused.

Embodiment 3

FIGS. 5A and 5B are plan views showing a configuration of a liquid crystal display device according to Embodiment 3 of the present invention. This embodiment differs from Embodiment 1 in that, among portions of the pixel electrode 5 making up the storage capacitance 8, a portion having a shape common to the feeding side (FIG. 5A) and the termination side (FIG. 5B) (a commonly shaped portion) extends beyond the busbar 7, while a portion 53 that is added at the feeding side is located within the busbar 7. Note here that the busbar 7 functions as the common electrode for the storage capacitance 8 in the same manner as in the above-described embodiments.

According to this embodiment, the pixel electrode 5 is in contact with a neighboring portion 52, which corresponds to the commonly shaped portion of the storage capacitance 8, at both of the feeding side and the termination side. On the other hand, the busbar 7 is in contact with a neighboring portion 51, which corresponds to the differently shaped portion of the storage capacitance 8, at both of the feeding side and the termination side.

Therefore, although the area of the storage capacitance 8 is altered for each pixel, electric fields at portions contributing to display (i.e., a gap between the pixel electrode 5 and the counter electrode 6) can be kept uniform. Moreover, the aperture ratio can be uniform without forming a light-shielding film. Furthermore, even in the case where a light-shielding film is formed for enhancing the contrast, a narrow light-shielding film is good enough compared with the configuration shown in FIG. 3, and therefore the aperture ratio is not degraded considerably.

According to the liquid crystal display device of this embodiment, a portion of the pixel electrode 5 making up the commonly shaped portion of the storage capacitance 8 is configured so as to extend beyond the busbar 7, so that the storage capacitance can be made larger than that in Embodiment 1. Therefore, the stability in the pixel potential can be enhanced, so that a liquid crystal display device tolerant of disturbances in the image due to a noise in the driving voltage waveform can be obtained.

In addition, this embodiment is suitable for a large-sized and high-resolution device for the reason that the time constant of the scanning electrode 1 is small because the storage capacitance 8 is not formed on the scanning electrode 1. Furthermore, as in the case of Embodiment 2, this embodiment also has the advantage of suppressing a break in the line at the step, thus improving the yields of the product.

Embodiment 4

FIGS. 6A and 6B are plan views showing a configuration of a liquid crystal display device according to Embodiment 4 of the present invention. In these figures, although the pixel electrode 5 is made of the same electrode layer as in the image signal line 2 like the above embodiments, the hatch pattern is omitted and a bold outline is used for the sake of clarity.

The feature of this embodiment resides in that, among portions of the busbar 7 making up the storage capacitance 8, a portion having a shape common to the feeding side (FIG. 6A) and the termination side (FIG. 6B) extends beyond the pixel electrode 5, while a narrowed portion 63 at the termination side is located within the pixel electrode 5. Note here that the busbar 7 functions as the common electrode for the storage capacitance 8 in the same manner as in the above-described embodiments.

According to this embodiment, the busbar 7 is in contact with a neighboring portion 62, which corresponds to the commonly shaped portion of the storage capacitance 8, at both of the feeding side and the termination side. On the other hand, the pixel electrode 5 is in contact with a neighboring portion 61, which corresponds to the differently shaped portion of the storage capacitance 8, at both of the feeding side and the termination side.

Therefore, although the area of the storage capacitance 8 is altered for each pixel, electric fields at portions contributing to display (i.e., a gap between the pixel electrode 5 and the counter electrode 6) can be kept uniform. Moreover, the aperture ratio can be uniform without forming a light-shielding film. Furthermore, even in the case where a light-shielding film is formed for enhancing the contrast, a narrow light-shielding film is good enough compared with the configuration shown in FIG. 3, and therefore the aperture ratio is not degraded considerably.

Furthermore, this embodiment is suitable for a large-sized and high-resolution device for the reason that the time constant of the scanning electrode 1 is small because the storage capacitance 8 is not formed on the scanning electrode 1.

Embodiment 5

FIGS. 7A and 7B are plan views showing a configuration of a liquid crystal display device of Embodiment 5 of the present invention. In this embodiment, the storage capacitance 8 is formed at the scanning electrode 1 and not at the busbar 7 as in the above-described embodiments, where the storage capacitance 8 is formed by sandwiching an interlayer insulating film between the scanning electrode 1 and the pixel electrode 5.

At a portion making up the storage capacitance 8, an outline of the pixel electrode 5 is located within the scanning electrode 1. A shape of the pixel electrode 5 is altered for each pixel, so that the overlapping area is decreased gradually from the feeding side (FIG. 7A) to the termination side (FIG. 7B). As a result, the storage capacitance value also is decreased gradually from the feeding side to the termination side.

In this embodiment also, the pattern in the overlapping portion is designed so that the pixel electrode 5 with a shape altered for each pixel is located within the opposite scanning electrode 1 as in the case of Embodiment 1. Therefore, even with the provision of a protrusion portion 71 to the pixel electrode 5, electric fields around the storage capacitances 8 and aperture ratios can be made constant irrespective of pixels, so that uniform display without irregularities can be realized.

In addition, according to the configuration of this embodiment, the scanning electrode 1 is in contact with a neighboring portion 72 at both of the feeding side and the termination side. Therefore, although the area of the storage capacitance 8 is altered for each pixel, electric fields at portions contributing to display (i.e., a gap between the pixel electrode 5 and the counter electrode 6) can be kept uniform. Moreover, the aperture ratio can be uniform without forming a light-shielding film. Furthermore, even in the case where a light-shielding film is formed for enhancing the contrast, a narrow light-shielding film is good enough compared with the configuration shown in FIG. 3, and therefore the aperture ratio is not degraded considerably.

In the liquid crystal display device according to this embodiment, the storage capacitance 8 is formed on the scanning electrode 1, so that the width of the busbar 7 connecting the counter electrodes 6 can be narrowed compared with the devices in Embodiments 1 to 4, which leads to an advantage of an increase in the aperture ratio. Furthermore, this embodiment has another advantage in that the design and the process can be conducted easily because of its simple configuration.

Embodiment 6

FIGS. 8A and 8B are plan views showing a configuration of a liquid crystal display device according to Embodiment 6 of the present invention. In these figures, although the pixel electrode 5 is made of the same electrode layer as in the image signal line 2 like the above embodiments, the hatch pattern is omitted and a bold outline is used for the sake of clarity.

Unlike Embodiment 5 where the area of the pixel electrode 5 making up the storage capacitance 8 is altered for each pixel, in this embodiment the width of the scanning electrode 1 is altered for each pixel, so that the storage capacitance value is decreased from the feeding side (FIG. 8A) to the termination side (FIG. 8B).

In this embodiment also, the pattern in the overlapping portion is designed so that the scanning electrode 1 with a shape altered for each pixel is located within the pixel electrode 5 whose shape is not altered as in the case of Embodiment 5. Therefore, even with the provision of a concave portion in the scanning electrode 1, electric fields around the storage capacitances and aperture ratios of pixels can be made constant irrespective of pixels, so that uniform display without irregularities can be realized.

According to the configuration of this embodiment, the scanning electrode 1 is in contact with a neighboring portion 81 at both of the feeding side and the termination side, and the pixel electrode 5 is in contact with a neighboring portion 82 at both of the feeding side and the termination side.

Therefore, in the same manner as in the above-described embodiments, although the area of the storage capacitance 8 is altered for each pixel, electric fields at portions contributing to display (i.e., a gap between the pixel electrode 5 and the counter electrode 6) can be kept uniform. Moreover, the aperture ratio can be uniform without forming a light-shielding film. Furthermore, even in the case where a light-shielding film is formed for enhancing the contrast, a narrow light-shielding film is good enough compared with the configuration shown in FIG. 3, and therefore the aperture ratio is not degraded considerably.

In the liquid crystal display device according to this embodiment, the storage capacitance 8 is formed on the scanning electrode 1, so that the width of the busbar 7 connecting the counter electrodes 6 can be narrowed, which leads to an advantage of an increase in the aperture ratio Further, with the configuration where a portion of forming the storage capacitance 8 is expanded laterally as shown in FIGS. 9A and 9B, the storage capacitance 8 can be increased. Thereby the stability in the pixel potential can be enhanced, so that a liquid crystal display device tolerant of disturbances in the image due to a noise in the driving voltage waveform can be obtained.

Embodiment 7

FIGS. 10A and 10B are plan views showing a configuration of a liquid crystal display device according to Embodiment 7 of the present invention. This embodiment differs from Embodiment 5 in that, among portions of the pixel electrode 5 making up the storage capacitance 8, a portion having a shape common to the feeding side (FIG. 10A) and the termination side (FIG. 10B) extends beyond the scanning electrode 1, while a portion 93 that is added at the feeding side is located within the scanning electrode 1.

According to this embodiment, the pixel electrode 5 is in contact with a neighboring portion 92, which corresponds to the commonly shaped portion of the storage capacitance 8, at both of the feeding side and the termination side. The scanning electrode 1 is in contact with a neighboring portion 91, which corresponds to the differently shaped portion of the storage capacitance 8, at both of the feeding side and the termination side.

Therefore, although the area of the storage capacitance 8 is altered for each pixel, electric fields at portions contributing to display (i.e., a gap between the pixel electrode 5 and the counter electrode 6) can be kept uniform. Moreover, the aperture ratio can be uniform without forming a light-shielding film. Furthermore, even in the case where a light-shielding film is formed for enhancing the contrast, a narrow light-shielding film is good enough compared with the configuration shown in FIG. 3, and therefore the aperture ratio is not degraded considerably.

According to the liquid crystal display device of this embodiment, a portion of the pixel electrode 5 making up the commonly shaped portion of the storage capacitance 8 is configured so as to extend beyond the scanning electrode 1, so that the storage capacitance can be made larger than that in Embodiment 5. Therefore, the stability in the pixel potential 5 can be enhanced, so that a liquid crystal display device tolerant of disturbances in the image due to a noise in the driving voltage waveform can be obtained.

In addition, since the storage capacitance 8 is formed on the scanning electrode 1, the width of the busbar 7 can be narrowed, which leads to an advantage of an increase in the aperture ratio. Furthermore, as in the case of Embodiment 2 or the like, this embodiment also has the advantage of suppressing a break in the line at the step, thus improving the yields of the product.

Embodiment 8

FIGS. 11A and 11B are plan views showing a configuration of a liquid crystal display device according to Embodiment 8 of the present invention. In these figures, although the pixel electrode 5 is made of the same electrode layer as in the image signal line 2, the hatch pattern is omitted and a bold outline is used for the sake of clarity.

The feature of this embodiment resides in that, among portions of the scanning electrode 1 making up the storage capacitance 8, a portion having a shape common to the feeding side (FIG. 11A) and the termination side (FIG. 11B) extends beyond the pixel electrode 5, while at a narrowed portion 113 at the termination side, the scanning electrodes is located within the pixel electrode 5. The width of the scanning electrode 1 at this portion 113 is altered, whereby the storage capacitance value is altered.

According to this embodiment, the pixel electrode 5 is in contact with a neighboring portion 112, which corresponds to the differently shaped portion of the storage capacitance 8, at both of the feeding side and the termination side. The scanning electrode 1 is in contact with a neighboring portion 111, which corresponds to the commonly shaped portion of the storage capacitance 8, at both of the feeding side and the termination side.

Therefore, although the area of the storage capacitance 8 is altered for each pixel, electric fields at portions contributing to display (i.e., a gap between the pixel electrode 5 and the counter electrode 6) can be kept uniform. Moreover, the aperture ratio can be uniform without forming a light-shielding film. Furthermore, even in the case where a light-shielding film is formed for enhancing the contrast, a narrow light-shielding film is good enough compared with the configuration shown in FIG. 3, and therefore the aperture ratio is not degraded considerably.

In addition, since the storage capacitance 8 is formed on the scanning electrode 1, the width of the busbar 7 can be narrowed, which leads to an advantage of an increase in the aperture ratio.

Embodiment 9

FIGS. 12A and 12B are plan views showing a configuration of a liquid crystal display device according to Embodiment 9 of the present invention. In these figures, although the pixel electrode 5 is made of the same electrode layer as in the image signal line 2, the hatch pattern is omitted and a bold outline is used for the sake of clarity.

The feature of this embodiment resides in that the storage capacitance 8 is formed between the pixel electrode 5 and the busbar 7 functioning as the common electrode, and both shapes of the pixel electrode 5 and the busbar 7 are altered, whereby the storage capacitance value is altered for each pixel. At a narrow portion 124 of the pixel electrode 5 in FIG. 12B and the corresponding portion in FIG. 12A, the busbar 7 extends beyond the pixel electrode 5. At a narrow portion 123 of the busbar 7 in FIG. 12B and the corresponding portion in FIG. 12A, the pixel electrode 5 extends beyond the busbar 7.

According to this embodiment, the pixel electrode 5 is in contact with a neighboring portion 121 at both of the feeding side (FIG. 12A) and the termination side (FIG. 12B). The busbar 7 is in contact with a neighboring portion 122 at both of the feeding side and the termination side.

Therefore, although the area of the storage capacitance 8 is altered for each pixel, electric fields at portions contributing to display (i.e., a gap between the pixel electrode 5 and the counter electrode 6) can be kept uniform. Moreover, the aperture ratio can be uniform without forming a light-shielding film. Furthermore, even in the case where a light-shielding film is formed for enhancing the contrast, a narrow light-shielding film is good enough compared with the configuration shown in FIG. 3, and therefore the aperture ratio is not degraded considerably.

In this embodiment, the storage capacitance value is altered by altering the patterns of the two electrodes. In general, when manufacturing liquid crystal display devices, electrodes are patterned by the photolithography method. This patterning often generates a dimensional irregularity by the manufacturing lot and by the position on the panel. When the storage capacitance value is altered by altering a pattern of one electrode, such a patterning irregularity would directly lead to an irregularity in the storage capacitance. On the other hand, according to this embodiment that employs a combination of the two electrodes each having altered patterns, a dimensional irregularity in the pattern processing becomes hard to lead to an irregularity in the storage capacitance. This means that the generation of the display irregularity can be mitigated and therefore defective products are less generated, so that the yields can be improved.

It should be noted that the idea of this embodiment is effective also for a configuration where the storage capacitance 8 is formed between the pixel electrode 5 and the scanning electrode 1. In this case, the configuration shown in FIGS. 13A and 13B can be used instead of the configuration in FIG. 12. At a narrow portion 134 of the pixel electrode 5 in FIG. 13B and at the corresponding portion in FIG. 13A, the scanning electrode 1 extends beyond the pixel electrode 5. At a narrow portion 133 of the scanning electrode 1 and at the corresponding portion in FIG. 13A, the pixel electrode 5 extends beyond the scanning electrode 1.

Figure 14A:
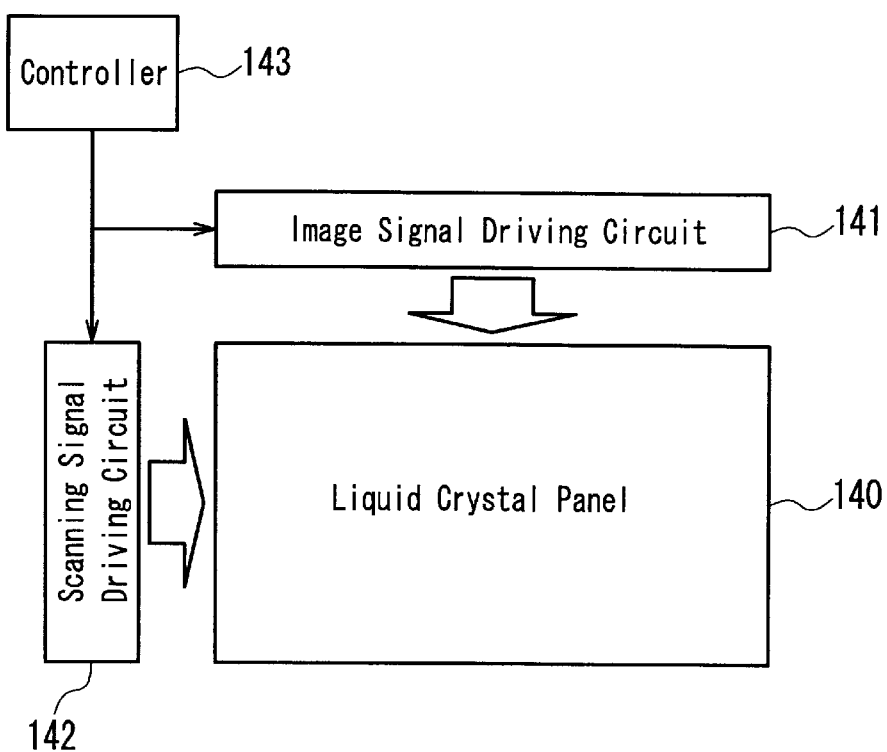
FIGS. 14A and 14B are block diagrams showing a configuration of a liquid crystal display device according to the present invention.
Figure 14B:
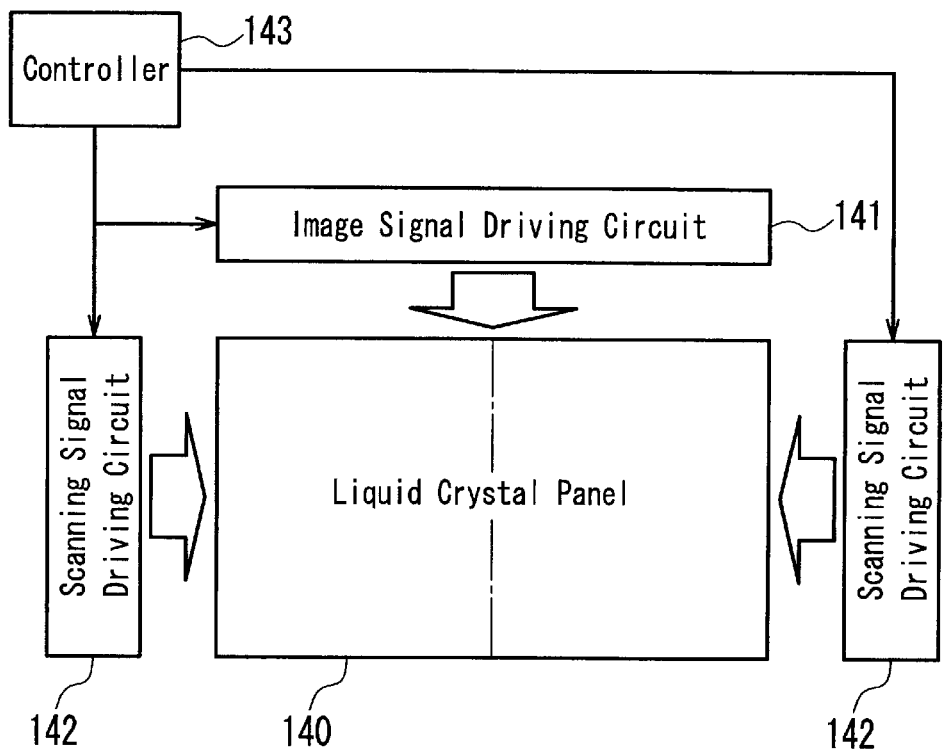
Figure 15:
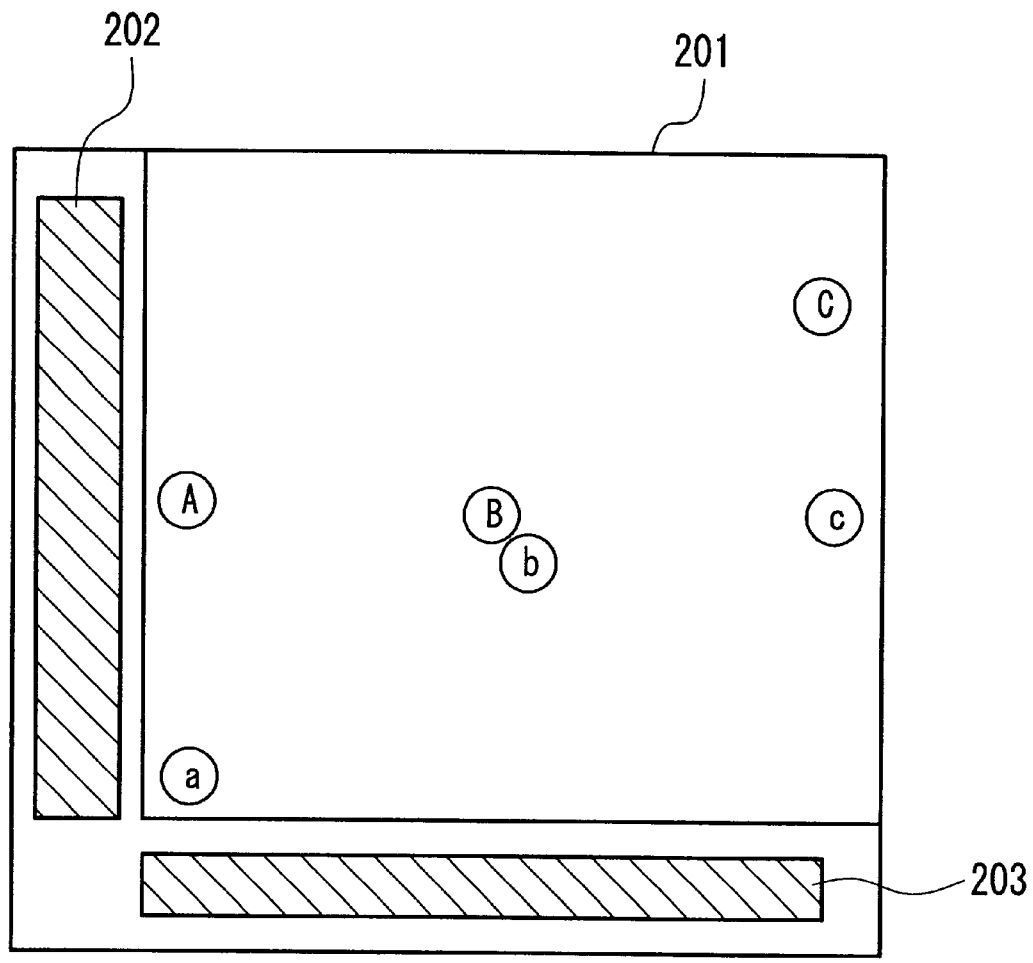
FIG. 15 is a plan view showing a conventional liquid crystal display device.

As shown in FIGS. 14A and 14B, an image signal driving circuit 141 and a scanning signal driving circuit 142, which are adapted to be controlled by a controller 143, are mounted on a liquid crystal panel 140 having the array configuration according to the above-stated embodiments, so that a liquid crystal display device is constructed. FIG. 14A shows a single sided feeding configuration where the scanning signal driving circuit 142 is formed on a single side of the liquid crystal panel 140, and FIG. 14B shows a double sided feeding configuration where the scanning signal driving circuits 142 are formed on either side of the liquid crystal panel 140. The double sided feeding configuration is effective for a large-sized liquid crystal display device of 20-inch or more in size and for a high-resolution liquid crystal display device having 1,000 or more of scanning lines, because this configuration can reduce the time constant of a scanning electrode. When driving these liquid crystal display devices, display superior in uniformity could be realized compared with the conventional device.

Since these liquid crystal display devices have a configuration of their storage capacitances being altered for each pixel position, the storage capacitance value at the feeding edge might become larger than usual, and therefore insufficient charging might occur at the feeding side. In this case, by employing a driving method of selecting two scanning lines concurrently and performing preliminary charging and not a normal driving method of driving a scanning line one by one, favorable results could be obtained.

Particularly, in the case of the operation of a large-sized liquid crystal display device of 20-inch or more in size and a high-resolution liquid crystal display device having 1,000 or more of scanning lines, which have the single-sided feeding configuration shown in FIG. 14A, the storage capacitance has to be altered greatly, and therefore the driving method of selecting two scanning lines concurrently is preferable.

The above-stated embodiments have a configuration where the storage capacitance is decreased gradually from the feeding edge to the termination of a scanning electrode. However, the configuration is not limited to this example, but insofar as a liquid crystal display device includes pixels with different storage capacitances, the present invention can be applied to any other configuration and their effects can be exerted sufficiently. For example, the present invention can be applied to a configuration where the storage capacitance is decreased gradually from the feeding edge to the termination of an image signal, in order to compensate a distortion of the image signal. Also, the present invention can be applied to the case where the storage capacitance is altered so as to compensate a difference in the properties of the driving circuit and a difference in the external wiring resistances.

A display mode of liquid crystals is not limited to the IPS method, but insofar as a pixel area includes a portion that is not covered with a pixel electrode, the present invention can be applied thereto.

As stated above, according to the liquid crystal display devices of the present invention, although the area of the storage capacitance is altered for each pixel, the aperture ratio can be kept constant and electric fields at portions contributing to display can be kept uniform. Therefore, the display properties are not impaired and nonuniform display can be avoided. Further, even in the case where a light-shielding film is formed for enhancing the contrast, a narrow light-shielding film is good enough compared with the conventional configuration, and therefore the aperture ratio is not degraded considerably.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A liquid crystal display device comprising a first substrate, a second substrate, and liquid crystals sandwiched between the first substrate and the second substrate, wherein the first substrate includes a plurality of pixels each of which is provided with a scanning electrode, an image signal electrode, a switching element provided at a point of intersection of the scanning electrode and the image signal electrode, a pixel electrode connected to the image signal electrode via the switching element, a counter electrode that activates the liquid crystals present between the counter electrode and the pixel electrode by a potential difference, and a busbar electrically connected to the counter electrode, a portion of the pixel electrode is overlapped with the busbar so as to make up a storage capacitance, the busbar includes: a commonly shaped portion having a shape common to pixels on a feeding side and pixels on a termination side; and a narrowed portion provided for the pixels on the termination side, the commonly shaped portion extending beyond the pixel electrode in a plan view of the device, and the narrowed portion at the termination side being located within the pixel electrode in the plan view of the device, and a shape of the narrowed portion provided at the termination side is altered for each pixel, so that a value of the storage capacitance becomes smaller from the feeding side to the termination side.

* * * * *